United States Patent
Hibbs

(10) Patent No.: US 9,534,097 B2
(45) Date of Patent: Jan. 3, 2017

(54) POLY(PHENYLENE ALKYLENE)-BASED LONOMERS

(71) Applicant: Sandia Corporation, Albuquerque, NM (US)

(72) Inventor: Michael R. Hibbs, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/694,875

(22) Filed: Apr. 23, 2015

(65) Prior Publication Data
US 2015/0307654 A1    Oct. 29, 2015

Related U.S. Application Data

(60) Provisional application No. 61/984,575, filed on Apr. 25, 2014.

(51) Int. Cl.
*C08G 61/02* (2006.01)
*C08G 61/10* (2006.01)
(Continued)

(52) U.S. Cl.
CPC .............. *C08J 5/2256* (2013.01); *C08G 61/02* (2013.01); *C08L 65/00* (2013.01); *H01M 8/1023* (2013.01);
(Continued)

(58) Field of Classification Search
USPC ........................................ 521/27, 25; 528/86
See application file for complete search history.

(56) References Cited

U.S. PATENT DOCUMENTS 4,419,486 A    12/1983  Rose
4,587,312 A    5/1986   Hergenrother et al.
(Continued)

FOREIGN PATENT DOCUMENTS

WO    WO9424717 A1    10/1994
WO    WO0225764 A1    3/2002
WO    WO03082956 A1   10/2003

OTHER PUBLICATIONS

Bauer, B., et al., "Anion-Exchange Membranes with Improved Alkaline Stability," Desalination (1990) 79, pp. 125-144.
(Continued)

*Primary Examiner* — Peter D Mulcahy
*Assistant Examiner* — Henry Hu
(74) *Attorney, Agent, or Firm* — Daniel J. Jenkins

(57) ABSTRACT

A composition and method of forming a composition including a compound including a poly(phenylene) backbone represented by the following formula:

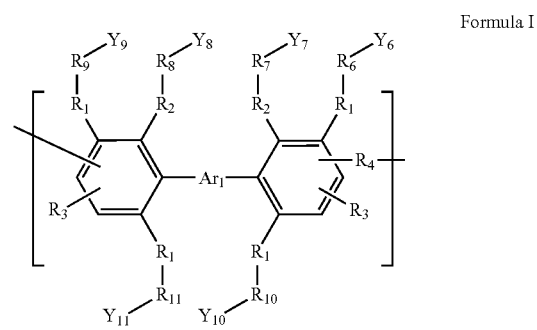

Formula I wherein each of $R_1$, $R_2$ and $R_3$ may be the same or different and is H or an unsubstituted or inertly-substituted aromatic
(Continued)

moiety; wherein $Ar_1$ is an unsubstituted or inertly-substituted aromatic moiety; wherein $R_4$ is an alkylene, perfluoroalkyl, polyethylene glycol, or polypropylene glycol moiety; wherein each of $R_6$, $R_7$, $R_8$, $R_9$, $R_{10}$ and $R_{11}$ is H or a monovalent hydrocarbon group including two to 18 carbon atoms, with the proviso that each $R_6$, $R_7$, $R_8$, $R_9$, $R_{10}$ and $R_{11}$ cannot be H; and wherein each of $Y_6$, $Y_7$, $Y_8$, $Y_9$, $Y_{10}$ and $Y_{11}$ may be the same or different and is H or a functional group are disclosed. The composition can be used as anion-exchange membranes and as an electrode binder material in anion exchange membrane fuel cells.

7 Claims, 4 Drawing Sheets

(51) Int. Cl.
- C08J 5/22 (2006.01)
- H01M 8/10 (2016.01)
- C08L 65/00 (2006.01)
- H01M 4/86 (2006.01)

(52) U.S. Cl.
CPC ..... C08G 2261/143 (2013.01); C08G 2261/19 (2013.01); C08G 2261/312 (2013.01); C08G 2261/3326 (2013.01); C08G 2261/3424 (2013.01); C08G 2261/46 (2013.01); C08G 2261/516 (2013.01); C08G 2261/598 (2013.01); C08J 2365/02 (2013.01); H01M 4/8668 (2013.01); H01M 2008/1095 (2013.01); Y02E 60/521 (2013.01)

(56) References Cited

U.S. PATENT DOCUMENTS

| | | | |
|---|---|---|---|
| 4,690,766 A | 9/1987 | Linder et al. | |
| 4,769,148 A | 9/1988 | Fibiger et al. | |
| 5,126,427 A | 6/1992 | Pfaendner et al. | |
| 5,403,675 A | 4/1995 | Ogata et al. | |
| 5,643,968 A | 7/1997 | Andreola et al. | |
| 5,886,130 A | 3/1999 | Trimmer et al. | |
| 5,965,679 A | 10/1999 | Godschalx et al. | |
| 6,590,067 B2 | 7/2003 | Kerres et al. | |
| 6,630,518 B1 | 10/2003 | Paronen | |
| 6,632,847 B1 | 10/2003 | Soczka-Guth et al. | |
| 6,716,548 B1 | 4/2004 | Kaliaguine et al. | |
| 6,780,893 B2 | 8/2004 | Sugaya et al. | |
| 6,977,122 B2 | 12/2005 | Colombo et al. | |
| 7,022,810 B1 | 4/2006 | Cornelius | |
| 7,094,490 B2 | 8/2006 | Cao et al. | |
| 7,125,953 B2 | 10/2006 | Lockley et al. | |
| 7,301,002 B1* | 11/2007 | Cornelius | C08G 61/10 428/500 |
| 7,615,300 B2 | 11/2009 | Bae et al. | |
| 7,772,344 B2 | 8/2010 | Inabe | |
| 7,816,482 B1* | 10/2010 | Hibbs | C08G 61/10 528/373 |
| 7,888,397 B1* | 2/2011 | Hibbs | B01D 71/38 521/27 |
| 7,947,800 B2 | 5/2011 | Liu et al. | |
| 8,110,636 B1* | 2/2012 | Fujimoto | C08F 8/36 525/471 |
| 8,809,483 B1* | 8/2014 | Hibbs | C08G 61/10 521/27 |
| 2002/0091225 A1 | 7/2002 | McGrath et al. | |
| 2005/0065285 A1 | 3/2005 | Buvat et al. | |
| 2007/0292730 A1 | 12/2007 | McGrath et al. | |

OTHER PUBLICATIONS

Fujimoto, C. H., et al., "Ionomeric Poly(phenylene) Prepared by Diels-Alder Polymerization: Synthesis and Physical Properties of a Novel Polyelectrolyte," Macromolecules (2005), 38(12), pp. 5010-5016.

Hibbs, M. R., et al., "Synthesis and Characterization of Poly(phenylene)-Based Anion Exchange Membranes for Alkaline Fuel Cells," Macromolecules (2009) 42(21), pp. 8316-8321.

Tanaka, M., et al., "Anion Conductive Block Poly(arylene ether)s: Synthesis, Properties, and Application in Alkaline Fuel Cells," J. Am. Chem. Soc., (2011) 133(27):10646-54.

Varcoe, J. R., et al., "Prospects for Alkaline Anion-Exchange Membranes in Low Temperature Fuel Cells," Fuel Cells, (2005) 5(2), pp. 187-200.

Wang, J., et al., "Synthesis of Soluble Poly(arylene ether sulfone) Ionomers with Pendant Quaternary Ammonium Groups for Anion Exchange Membranes," Macromolecules (2009) 42(22), pp. 8711-8717.

Ogliaruso, M., et al., "Chemistry of Cyclopentadienones", Chemical Reviews, (1965), vol. 65, pp. 261-367.

Hickner, M,. et al., "Transport in Sulfonated Poly(phenylene)s: Proton Conductivity, Permeability, and the State of Water", Polymer, (2006), vol. 47, pp. 4238-4244.

Mahltig, B., et al., "Adsorption and Structure Formation of Semi-Rigid Polyelectrolytes", (2005), vol. 52, pp. 404-407.

Shacklette, L.W., et al., "Solid-State Synthesis of Highly Conducting Polyphenylene from Crystalline Oligomers", J. Chem. Phys. (1980), vol. 73, pp. 4098-4102.

Hibbs, M., et al., "Poly(phenylene)-based Anion Exchange Membranes for Alkaline Fuel Cells", (2009), ECS Transactions, vol. 19, pp. 89-97.

Hibbs, M., et al., "Synthesis and Characterization of Novel Anion Exchange Membranes", (2007), Polymer Preprints, vol. 48, pp. 198-199.

Olson, T., et al., "Alkaline Fuel Cell Employing Novel Anion Exchange Membrane", 211th ECS National Meeting, Chicago, IL, May 2007.

Marsacq, et al., "Fabrication of Electrode-Membrane Assemblies Containing Heat-Stable Polymers for Fuel Cells", Chem Abstract 135:229352, 2001.

Trivedi et al., "Electrochemical Preparation of Immobilized Support for Triphase Catalysis", Journal of the Electrochemical Society of India, Chem Abstract 106:164429, 1986.

Ezquerra et al., "Electrical Conductivity in Poly-Phenylene Doped with Antimony Pentachloride and Chlorosulfonic Acid", Journal of Materials Science Letters, Chemical Abstract 103:187432, 1985.

* cited by examiner

POLY(PHENYLENE ALKYLENE)-BASED IONOMERS

RELATED APPLICATIONS

This application claims priority to U.S. Provisional Patent Application No. 61/984,575, filed on Apr. 25, 2014, and entitled "Synthesis of Poly(phenylene alkylene)-based Ionomers for Alkaline Fuel Cells," the entirety of which is incorporated herein by reference.

STATEMENT CONCERNING FEDERALLY SPONSORED RESEARCH

This invention was developed under Contract DE-AC04-94AL85000 between Sandia Corporation and the United States Department of Energy.

FIELD OF THE INVENTION

The present invention relates to poly(phenylene polymers) and poly(phenylene polymer membranes and binders for anion exchange membrane fuel cells.

BACKGROUND OF THE INVENTION

Recently, there has been increased interest in the development of anion exchange membrane fuel cells (AEMFCs). The fundamental difference between AEMFCs and the more widely studied proton exchange membrane fuel cells is that the former operate at high pH thus requiring the membrane to conduct hydroxide ions from the cathode to the anode. The key advantage of operating a fuel cell under alkaline conditions is the potential to forgo noble metal catalysts due to the low overpotentials associated with many electrochemical reactions at high pH. The improved electrokinetics also allow for the possible use of high energy density fuels such as ethanol which is also a renewable resource as it can be produced directly by fermentation of biomass.

A major challenge in the development of AEMFCs is the need for an anion exchange membrane (AEM) that is chemically stable under the conditions within an AEMFC. AEMs are typically made with polymers that have pendant cationic groups. By far the most commonly reported cationic group is the benzyl trimethylammonium (BTMA) cation. AEMs have been prepared with BTMA cations attached to polymer backbones such as poly(phenylene), poly(tetrafluoroethene-co-hexafluoropropylene), poly(phenylene oxide), poly(ether-imide), poly(arylene ether sulfone), and poly(ether ether ketone).

Many of these BTMA-containing membranes are reported to have good chemical stability. For example, the ion exchange capacity of a radiation-grafted perfluorinated AEM with BTMA cations was shown to decrease by less than 5% after a 233-hour fuel cell test at 50° C. Another study of the degradation mechanisms of tetraalkylammonium compounds concluded that maintaining hydration around the cations is critical to stability and that, under the correct conditions, such cations possess reasonable stability at temperatures above 60° C. Despite reports such as this, BTMA cations are generally considered to have insufficient stability for long-term use in AEMFCs. Thus the investigation of cationic groups with improved chemical stability is of paramount importance to the development of AEMFCs.

One relatively early study of cation stabilities found that quaternized 4,4'-diazobicyclo-[2.2.2]-octane cations had improved stability to alkaline conditions when compared to BTMA cations. Another approach to preparing more stable cations is to reduce susceptibility to nucleophilic attack by using resonance-stabilized cations such as guanidinium or imidazolium groups. Other reports have included the use of coordinated metal cations or phosphonium cations with bulky electron-donating substituents to both sterically protect the ion from nucleophilic attack and to lessen the charge density on the phosphorous atom. Additionally, it has been reported that attachment of quaternary ammonium groups to the polymer backbone via an alkylene spacer of >3 carbon atoms can lead to improved chemical stability. Attachment of imidazolium and guanidinium groups with alkylene spacers have also been reported.

AEMFCs also require a polymeric binder, or ionomer, to minimize interfacial resistance between the membrane and the electrodes. Typically, the ionomer is dissolved or suspended in a solvent which is then combined with the catalyst. The resulting catalyst ink is then painted or sprayed onto either the membrane or the gas diffusion layer prior to assembly of the cell. The role of the ionomer is to maximize the transport of ions, fuel, oxygen, and water within the electrodes. This is distinctly different from the role of the membrane, which is to block the passage of fuel and oxygen between the anode and the cathode while allowing the passage of ions and water. Despite these different roles, very polymers have been designed specifically to function as ionomers in AEMFCs and it is common practice to use the same polymer as both the membrane and the ionomer. This lack of optimized ionomers results in increased interfacial resistance between the electrodes and the membrane and a decrease in the efficiency and power output of the fuel cell.

What is needed is a polymer that is designed to be used as an ionomer in AEMFC electrodes. Such a polymer would have mechanical and chemical integrity to enable it to remain in place, unchanged during fuel cell operation. It would also have sufficient flexibility to enable the rapid permeation of a gas or liquid fuel to maximize the rate of reaction on the catalyst surface. It would also have the appropriate level of hydrophilicity to enable the movement of water within the electrodes and to avoid the overhydration condition known as flooding.

What is also needed is a binder that is chemically similar to the membrane and which is more permeable to oxygen and the fuel of interest than the membrane polymer. The ionomer should have water swelling properties that are similar to those of the membrane in order to avoid delamination of the electrodes during hydration/dehydration cycles in the fuel cell. The ionomer must be soluble or form a suspension in water, low molecular weight alcohols, or some combination of those. Also, the ionomer needs to have a chemical stability at high pH that is at least as good as the membrane because very thin layers of the ionomer will be subjected to high fluxes of hydroxide ions in the fuel cell during operation.

What is also needed is an anion exchange membrane with high ion conductivity and good chemical stability at high pH. The membrane should act as a barrier to the fuel of interest and to oxygen. Ideally, the membrane should have low water swelling, although low water content tends to reduce the conductivity, so these two properties must be balanced according to the needs of the specific cell.

SUMMARY OF THE INVENTION

According to an embodiment of the disclosure, a composition is disclosed that includes a compound having a poly(phenylene alkylene) backbone represented by the following formula:

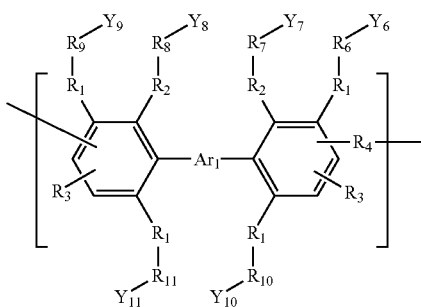

Formula I wherein each of $R_1$, $R_2$ and $R_3$ may be the same or different and is H or an unsubstituted or inertly-substituted aromatic moiety;

wherein $Ar_1$ is an unsubstituted or inertly-substituted aromatic moiety; wherein $R_4$ is an alkylene, perfluoroalkyl, polyethylene glycol, or polypropylene glycol moiety;

wherein each of $R_6$, $R_7$, $R_8$, $R_9$, $R_{10}$ and $R_{11}$ is H or a monovalent hydrocarbon group comprising two to 18 carbon atoms, with the proviso that each $R_6$, $R_7$, $R_8$, $R_9$, $R_{10}$ and $R_{11}$ cannot be H; and wherein each of $Y_6$, $Y_7$, $Y_8$, $Y_9$, $Y_{10}$ and $Y_{11}$ may be the same or different and is H or a functional group.

According to another embodiment of the disclosure, a method is disclosed that includes acylating a phenyl ring of a compound comprising a poly(phenylene alkylene) backbone with an acyl side chain comprising a monovalent hydrocarbon group comprising two to 18 carbon atoms and a functional group.

According to another embodiment of the disclosure, an article is disclosed that includes a compound having a poly(phenylene alkylene) backbone represented by the following formula:

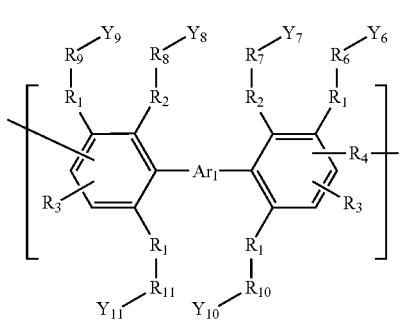

Formula I wherein each of $R_1$, $R_2$ and $R_3$ may be the same or different and is H or an unsubstituted or inertly-substituted aromatic moiety;

wherein $Ar_1$ is an unsubstituted or inertly-substituted aromatic moiety;

wherein $R_4$ is an alkylene, perfluoroalkyl, polyethylene glycol, or polypropylene glycol moiety;

wherein each of $R_6$, $R_7$, $R_8$, $R_9$, $R_{10}$ and $R_{11}$ is H or a monovalent hydrocarbon group comprising two to 18 carbon atoms, with the proviso that each $R_6$, $R_7$, $R_8$, $R_9$, $R_{10}$ and $R_{11}$ cannot be H; and wherein each of $Y_6$, $Y_7$, $Y_8$, $Y_9$, $Y_{10}$ and $Y_{11}$ may be the same or different and is H or a functional group.

An advantage of the present disclosure is the poly(phenylene alkylene) backbone has very good chemical stability at high pH.

Another advantage of the present disclosure is the sidechain attachment of the ammonium cations results in a significant improvement in cation stability compared to BTMA cations.

Another advantage of the present disclosure is the flexibility of the poly(phenylene alkylene) backbone which enables the diffusion of small species such as ions, fuel, and water through the thin layers of ionomer within the electrodes.

Another advantage of the present disclosure is that the disclosed poly(phenylene alkylene)s may be used as both the membrane and the electrode binder in an AEM. Such an arrangement would result in an AEMFC with low interfacial resistance between the membrane and the electrodes Another advantage of the present disclosure is the structural similarity between the ionomers and the TMAC6PP membranes described in U.S. Pat. No. 8,809,483, the combination of which allows for an AEMFC with low interfacial resistance between the membrane and the electrodes.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present disclosure is directed to poly(phenylene alkylene)-based Ionomers, methods of making poly(phenylene alkylene)-based Ionomers, and membranes and catalysts that include poly(phenylene alkylene)-based Ionomers.

According to the present disclosure, a new method of forming poly(phenylene alkylene)-based ionomers is disclosed. The disclosed methods builds upon and is different from the synthesis of a series of polymers derived from a poly(phenylene) backbone known as Diels-Alder Poly(phenylene) (DAPP). Four patents based on DAPP, its derivatives, and the membranes prepared from those are U.S. Pat. No. 7,301,002, entitled "Sulfonated Polyphenylene Polymers," granted Nov. 27, 2007; U.S. Pat. No. 8,110,636, entitled "Multi-Block Sulfonated Poly(phenylene) Copolymer Proton Exchange Membranes," granted Feb. 7, 2012; U.S. Pat. No. 7,816,482, entitled "Epoxy-Crosslinked Sulfonated Poly (phenylene) Copolymer Proton Exchange Membranes," granted Oct. 19, 2010; U.S. Pat. No. 7,888,397, entitled "Poly(phenylene)-based Anion Exchange Membranes," granted Feb. 15, 2011; herein incorporated by reference in their entireties. Of those patents, U.S. Pat. Nos. 7,301,002, 8,110,636, 7,816,482 describe the preparation of proton-exchange membranes (PEMs) from sulfonated versions of DAPP which may or may not be crosslinked or be composed of hydrophilic and hydrophobic blocks. U.S. Pat. No. 7,888,397 describes the synthesis of a methylated version of DAPP (MDAPP) which can be functionalized with benzyl trimethylammonium (BTMA) cationic groups and which can then be used to prepare anion-exchange membranes (AEMs).

Figure 1:
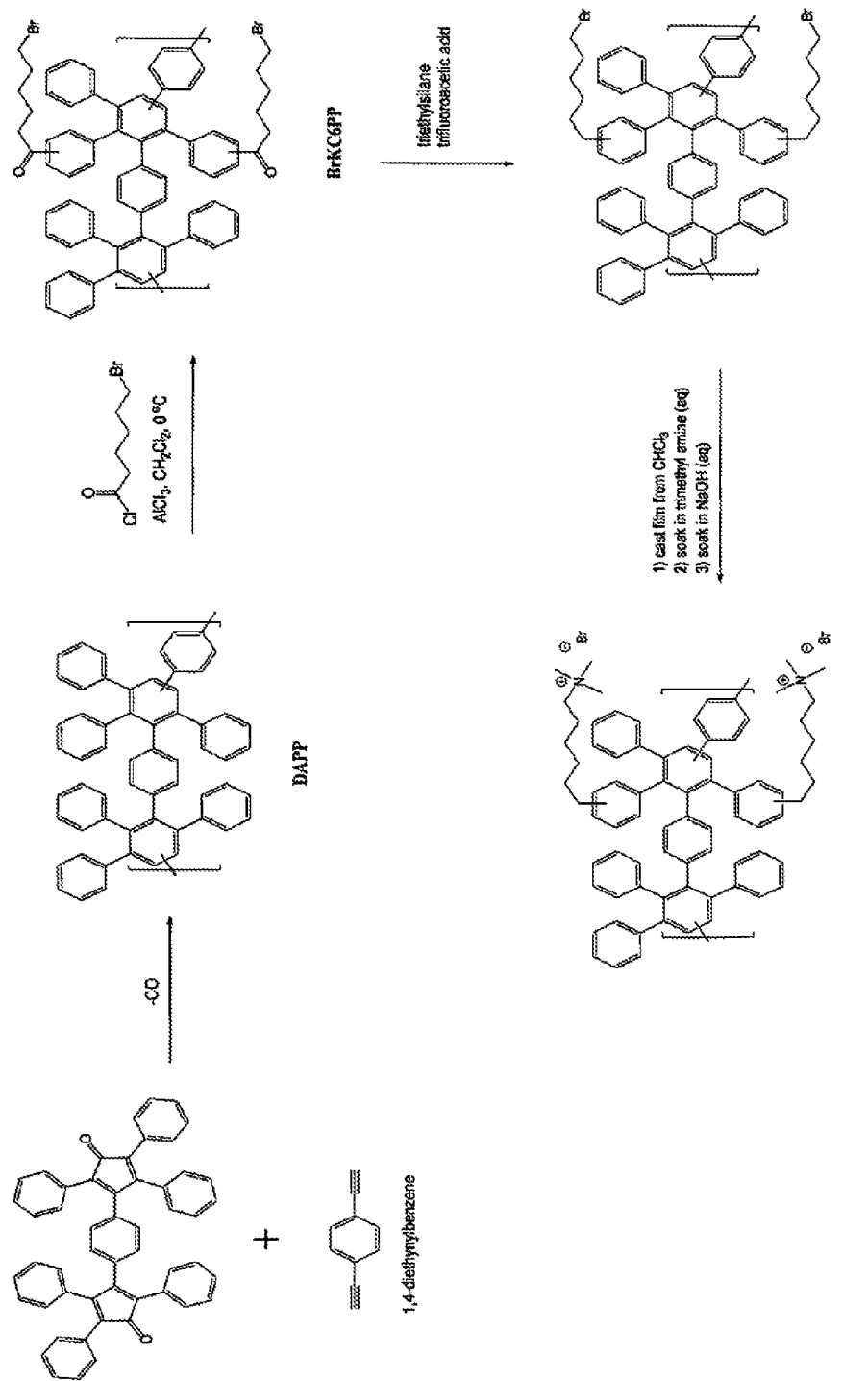
FIG. 1 illustrates a prior art synthesis method for TMAC6PP.

Additionally, U.S. Pat. No. 8,809,483, entitled "Functionalization of Poly(phenylene) by the Attachment of Sidechains," granted Aug. 19, 2014, herein incorporated by reference in its entirety, describes AEMs made from DAPP with sidechains attached to it. The polymer structure described in U.S. Pat. No. 8,809,483 discloses sidechains composed of hexamethylene units and wherein the cation is an alkyl trimethylammonium group (TMAC6PP). The synthetic scheme for forming TMAC6PP is shown in FIG. 1.

According to the present disclosure, a new polymer is disclosed wherein the backbone is no longer a pure poly (phenylene), but is instead a poly(phenylene alkylene) because one of the phenyl rings in the backbone of TMAC6PP has been replaced with a flexible hexamethylene unit.

According to one embodiment, a composition is disclosed that includes a compound including a poly(phenylene alkylene) backbone including a plurality of phenyl (aryl) rings, wherein at least one of the phenyl rings includes a side chain including a monovalent hydrocarbon group of two to 18 carbon atoms and a functional group.

A suitable compound including a poly(phenylene alkylene) backbone is illustrated in Formula I. Repeat units of Formula I may be polymerized to form polyphenylene polymers of between about 15 to 200 repeat units. Formula I is synthesized by various methods including Diels Alder reactions for example where a bis-tetraphenylcyclopetadienone reacts with 1,9-decadiyne to yield carbon monoxide and (polyphenylene alkylene). For ease of explanation, a poly(phenylene alkylene) polymer will be referred to herein as DAPPCX referencing a polyphenylene backbone modified with X methylene units.

The repeat unit contains R1, R2 and R3 of Formula I may be the same or different, wherein each R1, R2 and R3 is H or an unsubstituted or inertly-substituted aromatic or aliphatic moiety with the proviso that each of R1, R2 and R3 cannot be H. Ar1 represents an unsubstituted or inertly substituted aromatic moiety. R4 represents an alkylene, perfluoroalkyl, polyethylene glycol, or polypropylene glycol moiety.

Formula I

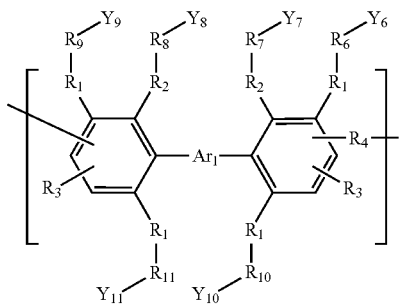

Aromatic moieties include phenyl polyaromatic and fused aromatic moieties that can be unsubstituted or inertly-substituted and include:

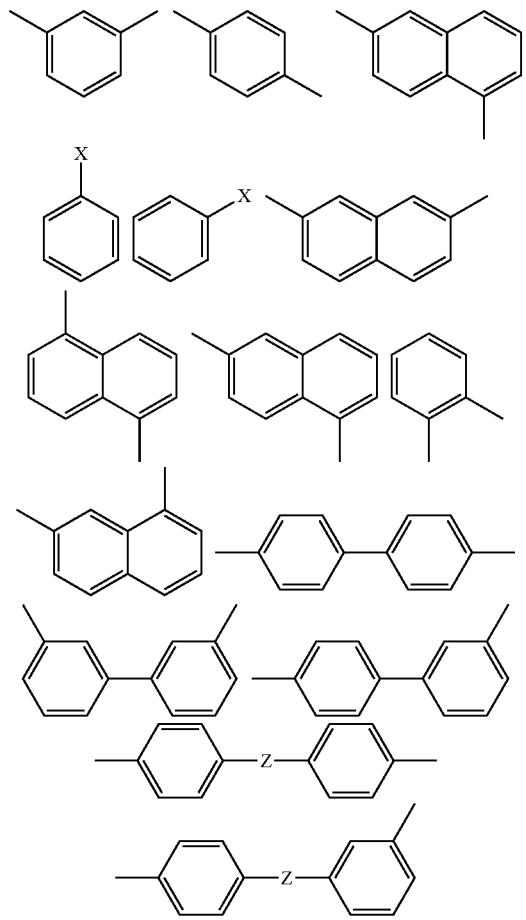

where each Z is selected from —O—, —S—, alkylene, —CF2-, —CH2-, —O—CF2-, perfluoroalkyl, perfluoroalkoxy,

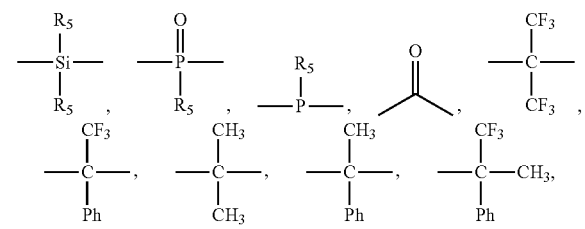

where R5 may be —H, CH3, —CH2CH3, —(CH2)CH3 or Ph, (where Ph is phenyl). Substituent groups that do not react under Diels Alder polymerization conditions and under casting film conditions define inert substituents. Functional groups include but are not restricted to x=CH3, CEt3, CMe3, CF3, NMe2, NH2, F, Cl, Br, OCH3, OH, OCF3, O-Ph, Ph, and SO3R5.

In one embodiment, the DAPPCX backbone has the structure of Formula II with an alternating pattern of three phenyl rings and a hexamethylene chain forming the backbone. There is a random mix of meta and para configurations along the backbone imparted by the (lack of) selectivity of a Diels-Alder polymerization and there are six pendant phenyl groups per repeat unit. The pendant phenyl groups provides for the introduction of up to six side chains, indicated as R6-R11.

Formula II

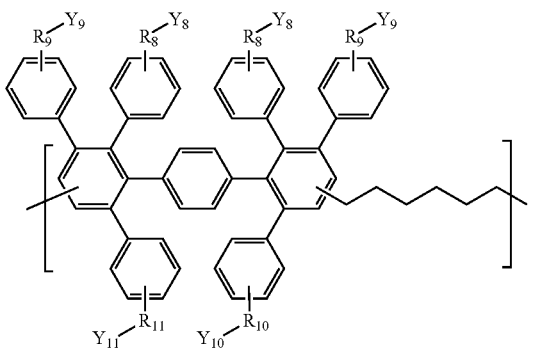

With reference to Formula I and Formula II, in one embodiment, each of R6-R11 is a hydrogen (H) or a monovalent hydrocarbon group including two to 18 carbon atoms that may be the same or different with the proviso that each of R6-R11 cannot be H. A monovalent hydrocarbon group may have a straight chain or a branched chain structure and may be saturated or unsaturated. Unsaturated monovalent hydrocarbon groups have one or more double bonds, one or more triple bonds, or combinations thereof. A monovalent hydrocarbon group may be substituted with one or more hydroxyl groups (—OH), oxo groups (═O), and substituted or unsubstituted amine groups. A straight or branched chain of a monovalent hydrocarbon group may also be interrupted by O, N, or S atoms.

With reference to Formula I and Formula II, one or more side chains R6-R11 can include a functional group, indicated as Y6-Y11 that may each be the same or different. A functional group Y6-Y11 may be attached as a pendant group anywhere in a chain of a monovalent hydrocarbon group. In one embodiment, a functional group Y6-Y11 is attached at the end of the chain. A functional group is selected to impart a desired property to a DAPPCX polymer, including rendering a functional group susceptible to substitution with another functional group. One example of a functional group is a functional group that is a cationic group. As noted above, polymers including pendant cationic groups have found use in anion exchange membranes. An example of a cationic group is an ammonium, phosphonium, sulfonium, or a nitrogen-containing resonance stabilized cation group, including but not limited to imidazolium, pyridinium and guanidinium. An example of a functional group that is susceptible to substitution with another functional group is a halogen group (e.g., chlorine, bromine). Such a halogen group is susceptible to substitution by a nitrogen-containing base, such as an amine. In a further embodiment, the side chain itself may serve as the functional group. In such an embodiment, the functional group Y6-Y11 would be a hydrogen atom (H).

Figure 2:
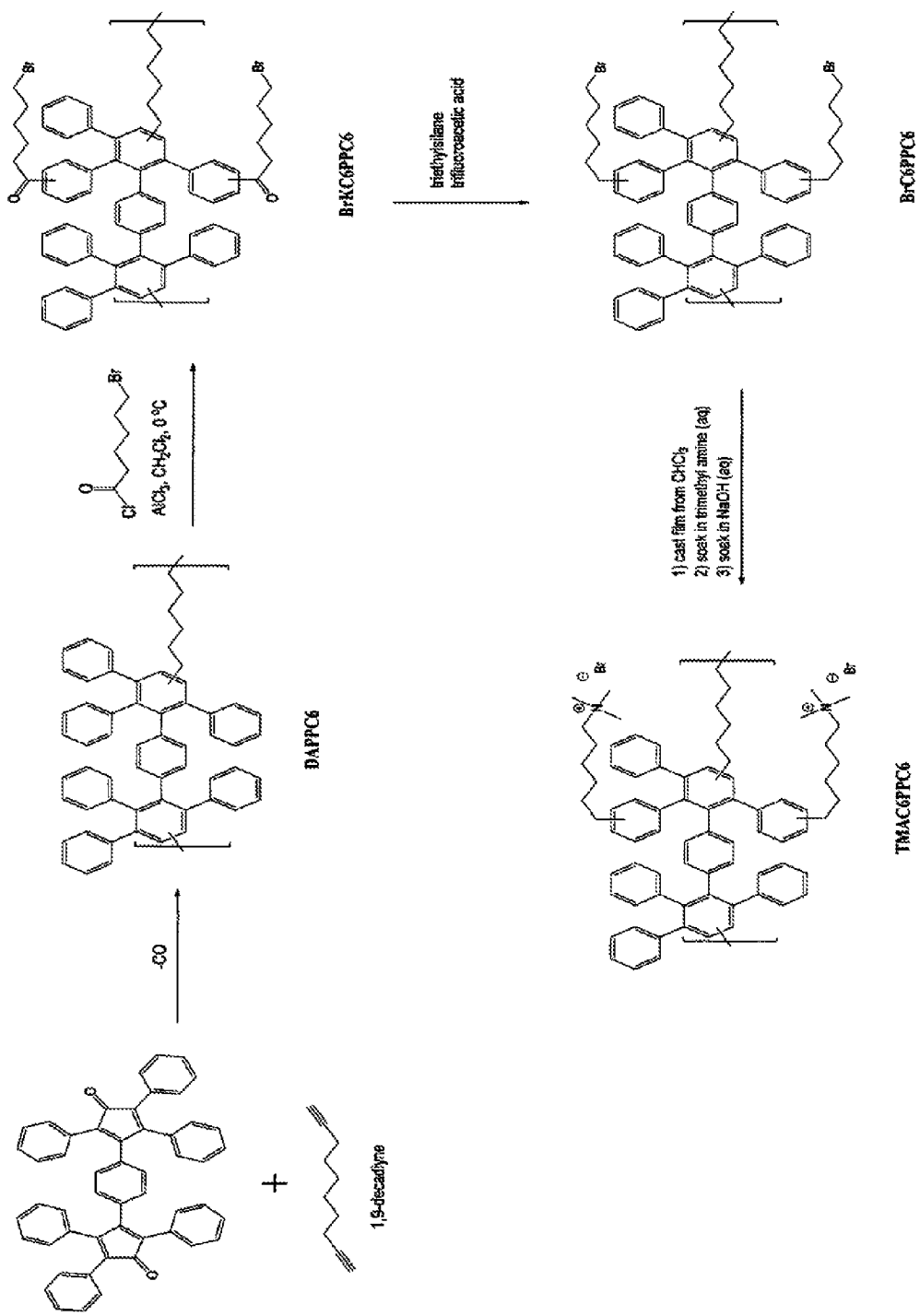
FIG. 2 illustrates an embodiment of a synthesis method for TMAC6PPC6 according to the present disclosure.

FIG. 2 illustrates an embodiment of synthetic steps required to prepare TMAC6PPC6. As can be seen in FIG. 2, the synthetic steps include a first step of forming DAPPC6 that includes a Diels-Alder reaction to form the poly(phenylene alkylene) backbone. During the polymerization, carbon monoxide is a by-product and a random sequence of meta- and para-substituted phenyl rings is formed in the phenylene portion of the backbone due to the random regiochemistry of the Diels-Alder reaction.

As can be FIG. 2, a second step of a scheme for attachment of side chains to a DAPPC6 is shown. In one embodiment, the side chains are attached using a Friedel-Crafts acylation reaction. Since none of the pendant phenyl rings in the DAPPC6 is deactivated, the acylation could take place on any of the phenyl rings. The peripheral phenyl rings are the most accessible and therefore the most likely points of attachment. Referring to FIG. 2, in this embodiment, a side chain of a monovalent hydrocarbon group including six carbon atoms including an acyl group and initially having a halogen functional group (bromine) at the end of the chain is attached to two different pendant phenyl rings of the DAPPC6. According to a Friedel-Crafts acylation process, the attachment is carried out by reacting an acyl chloride (6-bromohexanoyl chloride) with the DAPPC6 resulting in the structure identified as BrKC6PPC6. Although only two side chains are illustrated attached to the DAPPC6, it is appreciated that the number of side chains is controlled by the amount of acylating reagent used so polymers with varying degrees of functionalization can be prepared. Also, only one acylation reaction can occur per ring because the resulting attached acyl group (ketone) deactivates the ring.

Referring again to FIG. 2, an optional third step is disclosed wherein following the formation of BrKC6PPC6, the ketone functional group is reduced to a methylene group. The reduction can be done using triethylsilane, sodium borohydride, lithium aluminum hydride, zinc (Clemmensen reduction) or hydrazine (Wolff-Kishner reduction). So as can be seen in FIG. 2, BrKC6PPC6 is reduced to its fully reduced product identified as BrC6PPC6.

Referring again to FIG. 2, a fourth step is disclosed wherein following the formation of BrC6PPC6, the halogen functional group is substituted with a nitrogen-containing base. So as can be seen in FIG. 2, BrC6PPC6 includes a substituted functional group that is an ammonium group to TMAC6PPC6. In another embodiment, this fourth step may follow the second step.

The key difference between the schemes in FIGS. 1 and 2 is the replacement of the monomer 1,4-diethynylbenzene with 1,9-decadiyne in the very first step. Note that the 1,9-decadiyne is responsible for the new alkylene portion of the backbone and that a wide variety of diynes could be used to change the backbone and thus the membrane properties.

As described in U.S. Pat. No. 8,809,483, the side chains on the presently disclosed ionomer can also contain a wide variety of functional groups which would allow the design polymers and membranes with a range of properties. In, FIG. 2 the attachment of flexible hydrocarbon side chains is shown with a halide atom (bromine) at the terminal carbon atom, however, as described in U.S. Pat. No. 8,809,483, a wide variety of functional groups which would allow the design polymers and membranes with a range of properties. The halide atom can be displaced by a variety of tertiary amines or amine-containing heterocyclic molecules to produce polymers with tethered cations which can be used as AEMs. The side chains are attached using a Friedel-Crafts acylation reaction. Since none of the aryl rings in DAPPC6 are deactivated, the acylation reaction could take place anywhere on DAPPC6. The peripheral phenyl rings are the most accessible and therefore the most likely points of attachment. Only one acylation reaction can occur per ring because the resulting ketone deactivates the ring. The number of sidechains is controlled by the amount of acylating reagent used, so polymers with varying degrees of functionalization can be prepared.

The following paragraphs describe in more detail the exemplary process for forming TMAC6PPC6 illustrated in FIG. 2.

Synthesis of DAPPC6. 1,4-Bis(2,4,5-triphenylcyclopentadienone)benzene (2.999 g, 4.341 mmol), 1,9-decadiyne (0.583 g, 4.341 mmol), and diphenyl ether (47 mL) were charged to a flask under argon. The mixture was frozen in a dry ice/acetone bath and was freeze-thaw degassed (2 times) before heating at 160° C. for 24 h. The reaction was cooled to 100° C. and toluene (40 mL) was added to thin the solution before cooling to room temperature. The solution was poured into excess acetone and the precipitate was dried, redissolved in methylene chloride (40 mL), and reprecipitated in acetone. The resulting solid was dried under vacuum at 180° C. to yield a tan solid (2.07 g, 62%).

Synthesis of BrKC6PPC6. DAPPC6 (1.40 g, 1.82 mmol) was dissolved in dichloromethane (88 mL) in a flask under argon. The flask was chilled in an ice/water bath and 6-bromohexanoyl chloride (1.55 g, 7.28 mmoles) was added. Aluminum chloride (0.971 g, 7.28 mmol) was added to the flask and the mixture was allowed to stir for 2 hours. The bath was removed, and the reaction was allowed to warm to room temperature over 2 hours while stirring. The solution was poured into a beaker containing 200 mL deionized water and the beaker was heated to 60° C. to evaporate the organic solvent. After cooling to room temperature the mixture was filtered and the solid was blended with ethanol in a Waring blender. The mixture was filtered and the solid was dried at room temperature under vacuum to yield BrKC6PPC6 as an off-white solid (2.19 g, 81%).

Synthesis of BrC6PPC6. To a solution of BrKC6PPC6 (2.13 g, 1.69 mmol) in dichloroethane (100 mL) was added trifluoroacetic acid (25 mL) and triethylsilane (1.25 mL, 7.83 mmol). The solution was heated to reflux for 24 hours, then cooled to room temperature and poured into a beaker containing KOH (17 g) dissolved in water (150 mL). The beaker was heated to 80° C. to evaporate the organic solvent. After cooling to room temperature the mixture was filtered and the solid was blended with ethanol in a Waring blender. The mixture was filtered and the solid was dried at room temperature under vacuum. The solid was dissolved in methylene chloride (30 mL), reprecipitated in ethanol, blended with more ethanol, and dried at room temperature under vacuum to yield BrC6PPC6 as an off-white solid (2.03 g).

Synthesis of TMAC6PPC6. To a solution of BrC6PPC6 (1.20 g) in N,N-dimethylacetamide (27 mL) was added trimethylamine (3.8 mL of a 33 wt. % solution in ethanol) and the solution was allowed to stir at room temperature for 18 h. The solution was filtered through a syringe filter onto a square glass casting plate with 5.0 inch sides. The dish was held in a vacuum oven at room temperature for 4 h and then at 50° C. for 18 h. The resulting membrane was then immersed in 0.5 M HBr for 2 hours and then in deionized water for at least 24 hours to yield a TMAC6PPC6 membrane in its bromide counter-ion form.

Figure 3A:
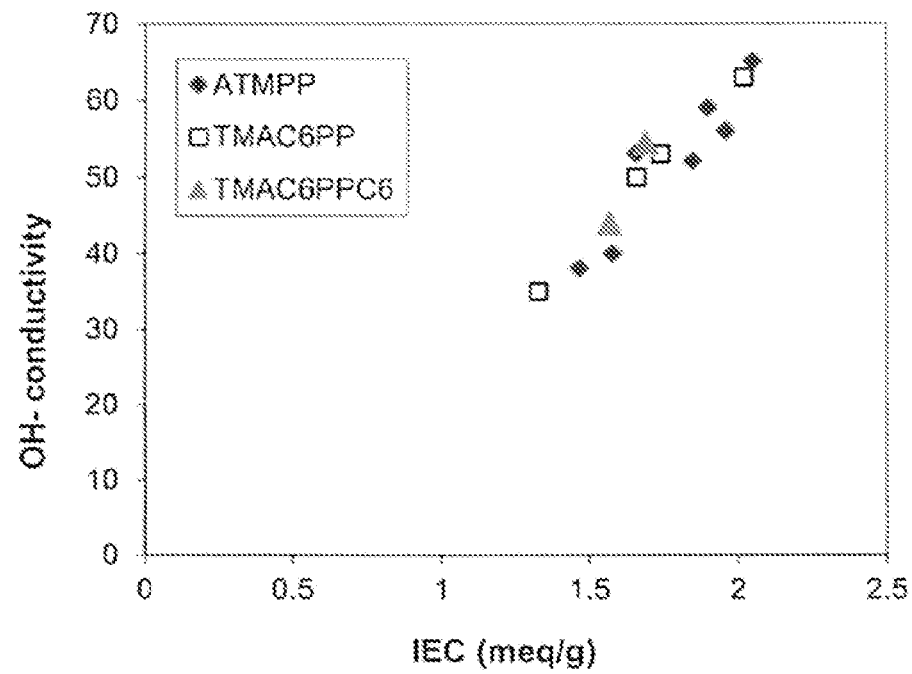
FIG. 3A shows hydroxide conductivity values versus IEC according to an embodiment of the disclosure.
Figure 3B:
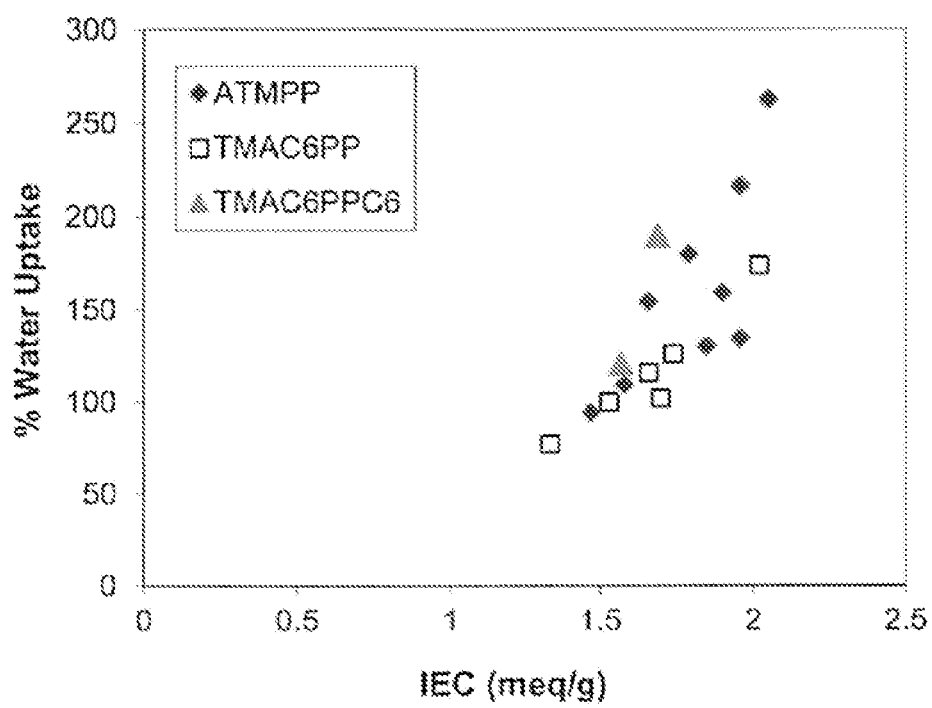
FIG. 3B shows water uptake values versus IEC according to an embodiment of the disclosure.

FIGS. 3A and 3B shows hydroxide conductivity and water uptake data, respectively, versus ion exchange capacity (IEC) for ATMPP, TMAC6PP, and TMAC6PPC6. Samples of TMAC6PPC6 with two different IEC values have been prepared so far and the data indicates that their conductivities and water uptakes are very similar to those ATMPP and TMAC6PP. Thus, TMAC6PPC6 could be used as a membrane as well as an ionomer although the increased permeability of fuel through TMAC6PPC6 would probably lead to high fuel crossover from the anode to the cathode (in the case of an AEMFC) which would hurt the efficiency of the fuel cell.

Figure 4:
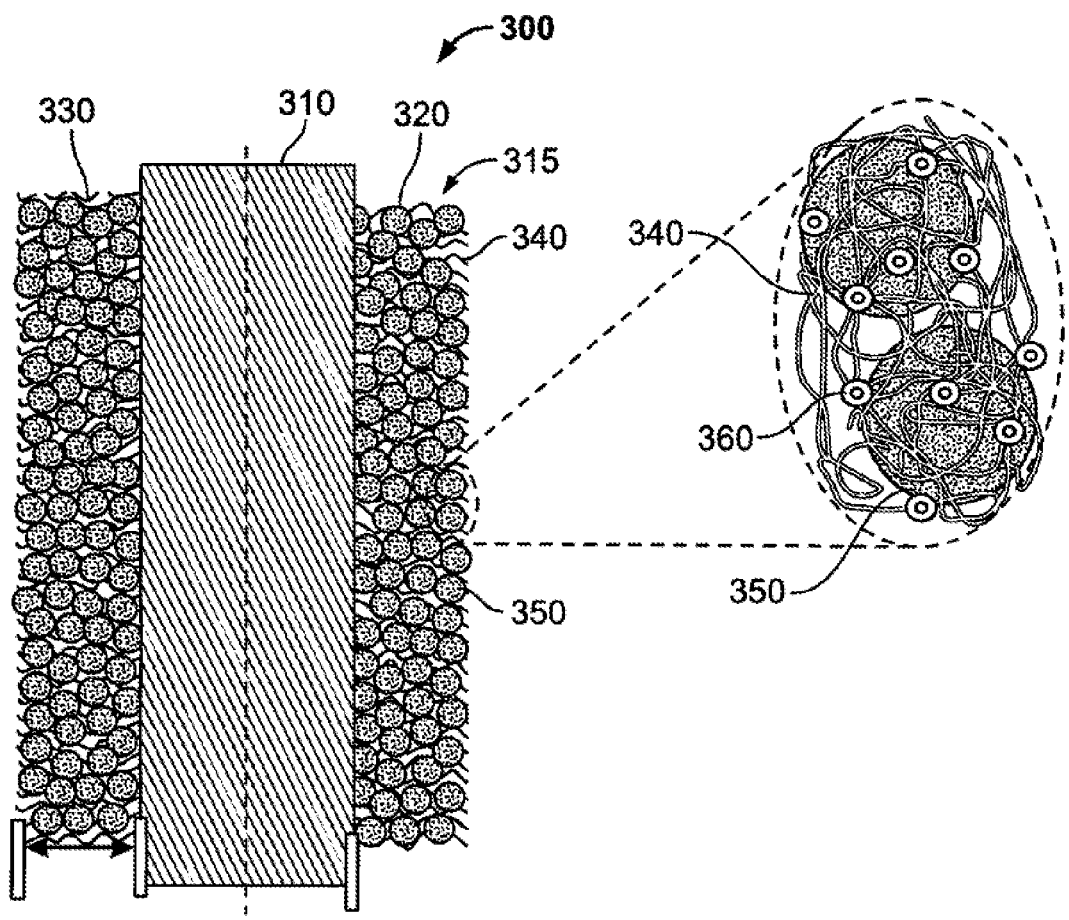
FIG. 4 is a schematic of a membrane-electrode assembly according to an embodiment of the disclosure.

FIG. 4 shows a schematic of a fuel cell membrane-electrode assembly (MEA) 300 according to the present disclosure. As can be seen in FIG. 3, the MEA 300 includes a membrane 310 sandwich or disposed between electrodes 315. The membrane 310 is formed of the disclosed ionomer discussed above. In another embodiment, the membrane 310 may include fabric or inorganic fiber supports. In this exemplary embodiment, the membrane 310 has a cross-sectional thickness of 20 nm. In another embodiment, the membrane 310 may have a cross-sectional thickness of between 15 and 150 nm.

The electrodes 315 include a cathode 320 and an anode 330. The electrodes 315 include the ionomer binder 340, a support 350 and a catalyst 360. The ionomer binder 340 is the ionomer of this disclosure.

The support 350 is carbon particles. In another embodiment, the support 350 may be a porous carbon network or a metallic nanopowder.

The catalyst 360 is a high-surface area metal that can reduce oxygen and oxidize the fuel of interest. In the cathode 320, the catalyst 360 may be a (metallic nanopowder or finely dispersed metal on a carbon support). In another embodiment, the catalyst 360 may be (Pt, Pd, Ru, Ni, Cu, Fe, Sn, Ag, or some combination of those dispersed on a carbon support). In the anode 330, the catalyst 360 may be a (metallic nanopowder or finely dispersed metal on a carbon support). In another embodiment, in the anode 330, the catalyst 360 may be (Pt, Pd, Ru, Ni, Cu, Fe, Sn, Ag, or some combination of those dispersed on a carbon support). In this exemplary embodiment, the electrodes 315 have a cross-sectional thickness of between 1 nm and 10 nm. In another embodiment, the electrodes 315 may have a cross-sectional thickness of between (0.1 and 100 nm).

The ionomer binder 340 serves as both an adhesive to hold the electrodes to the membrane and as a carrier of ions between the membrane 310 and the catalyst 350. The electrodes 315 must also be designed so that fuel and water can move easily through them to facilitate the electrochemical reactions. A major contributor to the low power densities of AEMFCs is poor reactant (fuel and/or oxygen) mass transport in the electrodes 315 and this, in turn, is due largely to the lack of available ionomers to use in the electrodes 315.

In this exemplary embodiment, the polymer that comprises the membrane 310 and the ionomer binder 340 are the same. In another embodiment, the membrane 310 and/or the ionomer binder 340 may be the same. Thus, the ionomer of this disclosure may be used for either or both the membrane 310 and the ionomer binder 340.

TMAC6PPC6 was designed specifically to be used as an ionomer in an AEMFC because of the flexible hexamethylene segments in the polymer backbone. Backbone flexibility is known to increase the permeability of small molecules through polymer films (permeability of fuels in TMAC6PPC6 such as methanol has not been tested yet). The backbone flexibility should also lower the glass transition temperature (Tg) of the polymer) and this in turn should lead to improved adhesion between the membrane and the electrodes during the hot press step of the MEA fabrication process.

It is also important for fuel cell electrodes to exhibit an amount of swelling upon hydration that is similar to that of the membrane in order to maintain good contact between the two components. Thus as TMAC6PPC6 is used in AEMFCs, it will be important to control the water swelling of the polymer either by adjusting the ion exchange capacity (the number of cationic sidechains) or by adding hydrophobic groups (hydrocarbon or fluorocarbon sidechains).

This disclosed ionomer technology has the potential to revolutionize fuel cell use in automotive and portable power applications. Alkaline fuel cells without precious metal catalysts were developed years ago but these traditional alkaline fuel cells required a liquid electrolyte because they lacked a true AEM and suffered from reliability problems because of the formation of solid carbonate in the presence of $CO_2$. Current research on alkaline AEM fuel cells (AEM- FCs) has shown that these membrane-based systems will not generate solid carbonate because of the absence of any mobile cation. They also mitigate potential corrosion problems by removing the liquid electrolyte.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
a poly(phenylene alkylene) backbone-containing compound, oligomer or polymer represented by the following formula:

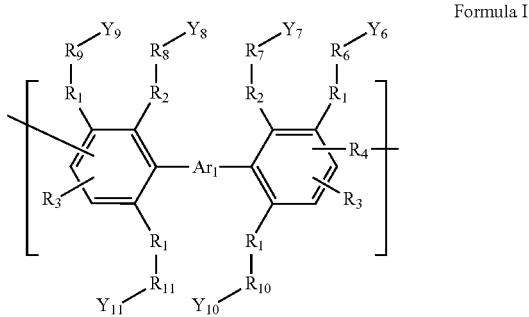

Formula I wherein each of $R_1$, $R_2$ and $R_3$ may be the same or different and is H or an unsubstituted or inertly-substituted aromatic moiety;

wherein $Ar_1$ is an unsubstituted or inertly-substituted linking moiety;

wherein $R_4$ is an alkylene, perfluoroalkylene, polyethylene glycol, or polypropylene glycol moiety;

wherein at least one of $R_6$, $R_7$, $R_8$, $R_9$, $R_{10}$ and $R_{11}$ is a saturated hydrocarbon group comprising two to 18 carbon atoms and remaining members of the group $R_6$, $R_7$, $R_8$, $R_9$, $R_{10}$ and $R_{11}$ are H; and wherein each of $Y_6$, $Y_7$, $Y_8$, $Y_9$, $Y_{10}$ and $Y_{11}$ present when $R_6$, $R_7$, $R_8$, $R_9$, $R_{10}$ and $R_{11}$ is a saturated hydrocarbon group comprising two to 18 carbon atoms may be the same or different and is H or a functional group.

2. The composition of claim 1, wherein either one or both of $R_1$ and $R_2$ comprises an acyl group and the side chain is attached to the at least one of the plurality of rings through the acyl group.

3. The composition of claim 1, wherein one or more of $R_6$, $R_7$, $R_8$, $R_9$, $R_{10}$ and $R_{11}$ comprises an alkylene group comprising two to 18 carbon atoms.

4. The composition of claim 1, wherein one or more of $Y_6$, $Y_7$, $Y_8$, $Y_9$, $Y_{10}$ and $Y_{11}$ when present comprises a nitrogen containing base.

5. The composition of claim 1, wherein one or more of $Y_6$, $Y_7$, $Y_8$, $Y_9$, $Y_{10}$ and $Y_{11}$ when present comprises a nitrogen containing resonant stabilized cation group.

6. A membrane comprising the composition of claim 1.

7. An electrode comprising the composition of claim 1.

* * * * *